[11] 3,549,917

[72] Inventors Helmut Espenschied
 Buhlertal;
 Georg Rothfuss, Ditzingen; Herbert Weyer, Stuttgart, Germany
[21] Appl. No. 864,450
[22] Filed Oct. 7, 1969
[45] Patented Dec. 22, 1970
[73] Assignee Robert Bosch G.m.b.H.
 Stuttgart, Germany
[32] Priority Oct. 8, 1968
[33] Germany
[31] No. 1,801,766

[54] LINEAR MOTOR ACTUATOR
 17 Claims, 5 Drawing Figs.
[52] U.S. Cl. ............................................ 310/14,
 310/23; 74/126
[51] Int. Cl. ............................................ H02k 41/02
[50] Field of Search ........................................ 310/12
 —14, 23, 24, 30, 34, 35; 319/123; 79/126

[56] References Cited
 UNITED STATES PATENTS
| | | | |
|---|---|---|---|
| 3,132,290 | 5/1964 | Kumpf.......................... | 317/123 |
| 3,299,302 | 1/1967 | Frisch........................... | 310/14X |
| 3,378,031 | 4/1968 | Hatashita ...................... | 310/24X |
| 3,449,603 | 6/1969 | Hursen.......................... | 310/14X |

*Primary Examiner*—D. F. Duggan
*Attorney*—Michael S. Striker

ABSTRACT: A displacement motor arrangement in which an electromagnet is provided with two spaced windings arranged axially with respect to an armature, one behind the other. A displacement member is linked to the armature through a latching arrangement which is operative in one direction only. Springs are applied to the armature for holding the latter in a central position between the windings when the armature is not actuated through energizing of the windings. The armature is loosely supported on the displacement member so that when the armature becomes actuated through energizing of the windings, the latching arrangement causes displacement or movement of the displacement member by a predetermined amount.

INVENTORS
Helmut ESPENSCHIED
Georg ROTHFUSS
Herbert WEYER
BY

Michael S Striker
their ATTORNEY

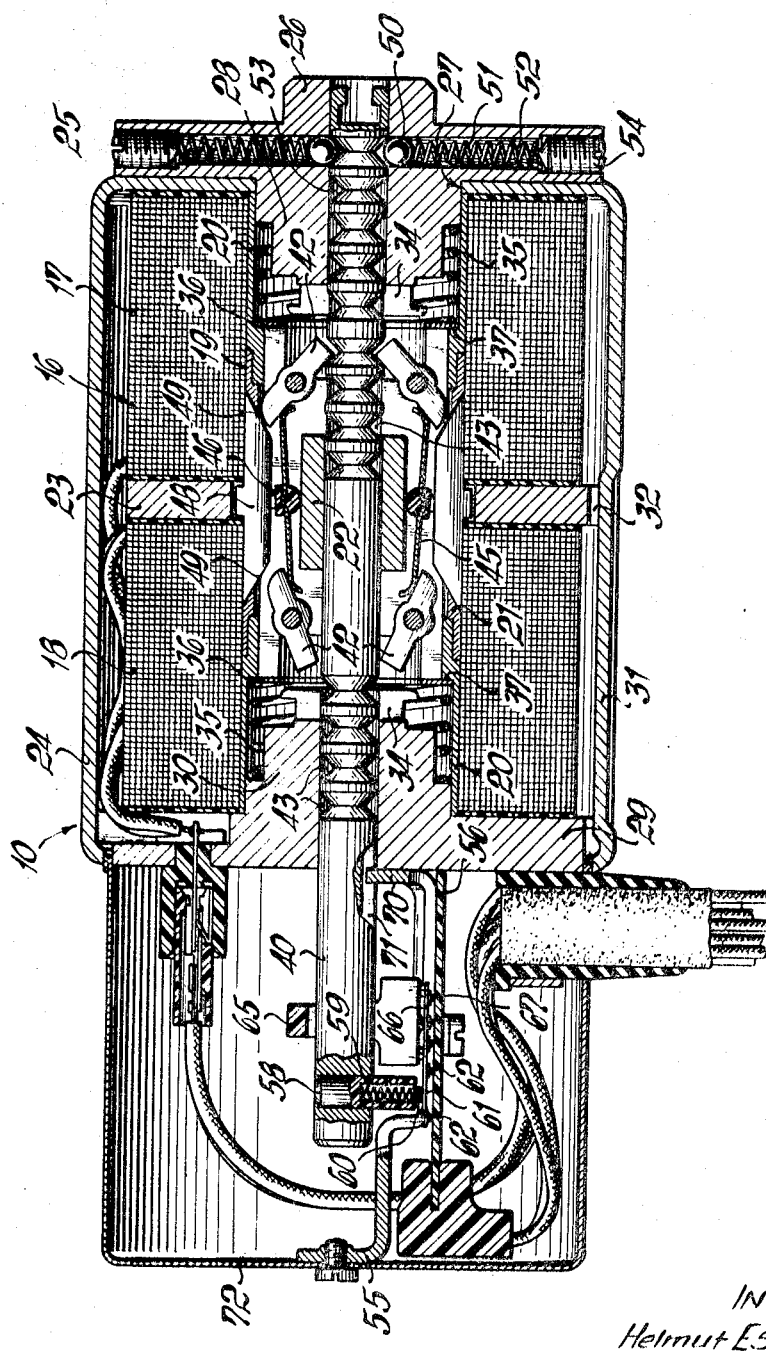

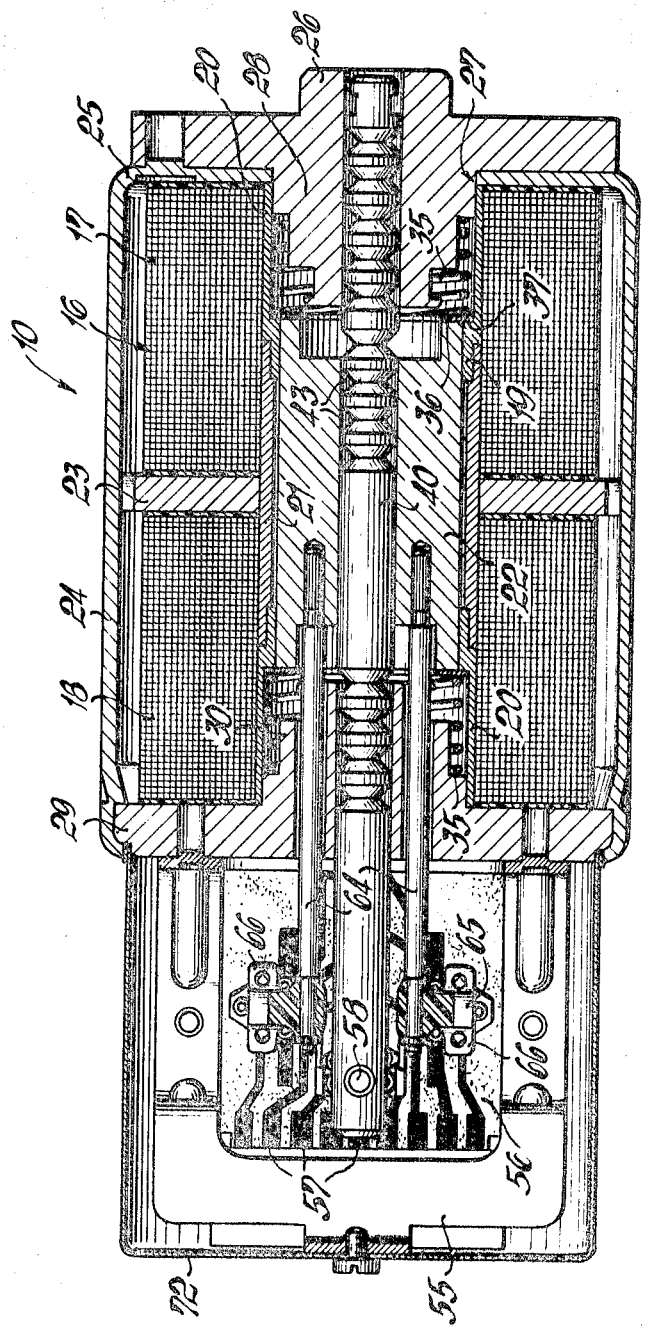

LINEAR MOTOR ACTUATOR

BACKGROUND OF THE INVENTION

The present invention resides in a displacement motor with a power or force generator controlled through electrical signals. The force or power generator is designed so that it tends to displace a positioning member by at least one step in one direction, and by at least one step in the opposite direction.

Displacement motors of these species, as known in the art, are provided with a rotating armature which positions the displacement or positioning member through a linkage mechanism. These motors have the disadvantage that their displacement velocity is not sufficient, in many cases, and that they are relatively complex. Such complexity results from the condition that in addition to the linkage mechanism, a brake is also required for the rotating armature for regulating purposes. The brake is essential to control the displacement with sufficient precision.

Accordingly, it is an object of the present invention to provide a displacement motor which is simple in construction, has a high switching velocity, and high switching accuracy.

This object of the present invention is achieved by providing an electromagnet for the force or power generator of the displacement motor. This electromagnet has two windings arrangement axially one behind the other, and an armature. The armature is retained in a central position between the windings or coils, through the action of spring members. The armature, furthermore, is seated loosely upon a displacement or positioning member in the form of a switching rod. When attracted, the armature has an effect upon a blocking device in one direction only.

A motor designed in this manner, may be constructed from simple and firmly-built parts, without incurring assembly problems. Such motor designs lend itself, therefore, to mass production. The high displacement velocity and precision accuracy of the motor, as well as the possibility that it may be constructed to execute a larger number of switching steps in either direction, wide areas of application are opened to this design. The motor can be advantageously used in hydraulic arrangements or hydraulic drives in which a control slide coupled to the switching rod monitors a number of flow lines through a predetermined program. Through this design, a savings may be incurred with a number of magnetic valves, and the electrical power required for controlling the arrangement may be substantially reduced. At the same time, the displacement motor becomes only briefly switched on during the operating process.

A particular simple design of the displacement motor is realized when a rocker member is pivotably arranged at each frontal end of the armature. The rocker member is subjected to a force of the spring which tends to pivot or turn the rocker member into the blocking position. Each rocker is, furthermore, associated with an incline secured to the armature guide. This incline serves to lift the rocker from its blocking position, as soon and for as long the armature has left the central position.

At each frontal end, the armature is provided with radial slots for receiving two diametrically oppositely lying rocker members, taken relative to the switching rod.

It is particularly advantageous when the armature is provided at its periphery with two diametrically oppositely lying longitudinal notches which communicate with the frontal slots, and receive the springs of the rocker members. The rocker members which are arranged to a longitudinal notch can, thereby, have a common leaf spring within the abutting rocker members. The springs are mounted substantially at their central portion between the rocker members, and are pivotably held. Through this arrangement, the leaf springs have a long length and thereby a high operational endurance accompanied by long operating life.

In a further embodiment of the present invention, a plate provided with contact tracks is arranged at one frontal side of the magnetic system and parallel to the switching rod. The switching rod projects over the contact tracks and presses thereon with spring contacts.

It is through this arrangement that feedback is realized through which the position of the switching rod is transmitted with substantial precision and rapidity to the central control unit which communicates with the arrangement of the motor. The motor is, thereby, also well-adapted for building into electronically controlled arrangements or installations.

SUMMARY OF THE INVENTION

A displacement motor arrangement in which a displacement member in the form of a displacement rod is operatively coupled to a force applying member which tends to displace the rod by a predetermined increment in one and in the opposite directions. An electromagnet is provided with two windings spaced from each other and axially arranged one behind the other with respect to an armature. The latter is situated when the electromagnet becomes energized, against the action of spring members which tend to retain the armature in a central position between the two windings, when the armature is not actuated through energizing of the windings. The armature is, furthermore, loosely supported on the displacement member or rod. A latching arrangement in the form of spring actuated rocker levers link the armature and the rod so that upon actuation of the armature, the displacement member in the form of the rod is displaced by a predetermined magnitude. The novel features which are considered as characteristic for the invention are set forth in particular in the appended claims. The invention itself, however, both as to its construction and its method of operation, together with additional object and advantages thereof, will be best understood from the following description of specific embodiments when read in connection with the accompanying drawing.

BRIEF DESCRIPTION OF THE DRAWING

FIG. 2 is a sectional and enlarged view of the motor of FIG. 1;

FIG. 3 is a sectional view of the motor through a diametrical plane perpendicular to that of FIG. 2;

DESCRIPTION OF THE PREFERRED EMBODIMENTS

Figure 1:
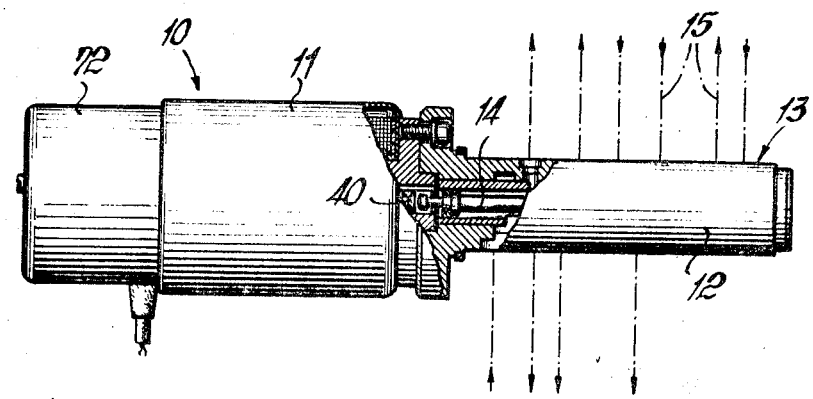
FIG. 1 is a front view of a displacement motor for a hydraulically operated motor vehicle, with parts broken away.

Referring to the drawing, a housing 11 connects to a housing 12 carrying a hydraulic control apparatus 13. A control rod 14, within the housing 12, is slidably mounted. A plurality of flow lines 15 to-and-from the mechanism, provide indications of the positions of the motor. Control arrangements of this type are known in the art.

The motor 10 has an electromagnet 16 with two coils 17 and 18 arranged axially behind each other. These coils are individually energizable through a centrally located electronic control unit, now shown. The coils are seated upon a sleeve member 19 which is composed of two bushings 20 made of brass, and an iron ring 21. An armature 22 is slidably guided in the bushing 20. This is shown in FIG. 3. The iron ring 21 has somewhat of a larger internal diameter than the bushings 20, so that a uniform air gap prevails over the entire circumference of the armature 22. The coils or woundings 17 and 18 lie against an iron disc 23 which is securely pressed onto the iron ring 21. The housing 11 has a sheet metal case 24, in which the other side of the coil or winding 17 lies at the floor or base 25. An ferromagnetic core 26 is secured to the base 25. This core 26 carries, in turn, an iron core or ferromagnetic core 28 projecting from the interior of the housing, through the opening 27 in the base of the housing. The case 24 is closed through a ferromagnetic member 29 shaped to include a ferromagnetic core 30. The sleeve member 19 is mounted upon the ferromagnetic cores 28 and 30, and serves to secure the windings and the iron ring 23 against axial movement. At the same time, the sleeve member 19 serves to retain the windings and the iron ring 23 centrally local. The iron disc 23 lies fixed against the rear wall of the case 24. The latter has an embossment which grips the iron disc 23 through a rim portion 32, and thereby assures that the magnetic system is fixed in relation to the housing.

Figure 4:
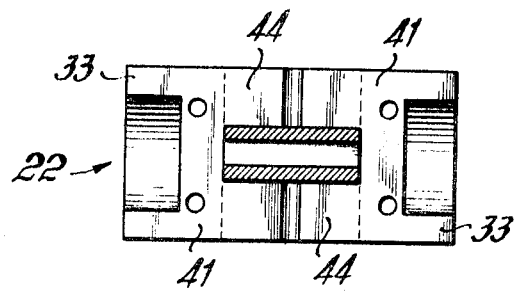
FIG. 4 is a sectional elevational view of the motor armature of the arrangement of FIG. 2.
Figure 5:
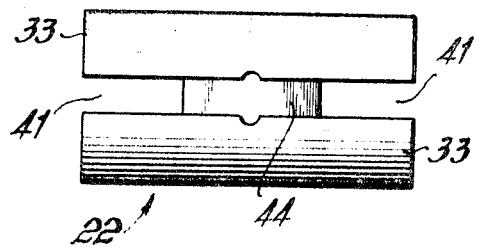
FIG. 5 is a plan view of the motor armature of FIG. 4.

The field lines or flux lines of the winding 17 pass through the iron disc 23, the case 24, and the iron core 26 and into the iron core 28. From there, the flux lines pass through an axial air gap and into the armature 22. The flux lines then return to the iron disc 23, by way of the iron ring 21. The flux lines or field lines of the winding 18 are similarly situated. The armature is provided at both ends with axial ring-shaped portions 33 as shown in FIG. 4. Through these ring-shaped portions 33, the armature contacts the iron cores 28 or 30 through a bushing-shaped member 34, when in the respective actuated state.

Two coil springs 28 and 30 abut against the ferromagnetic cores 28 and 30, and influence the armature through the non-magnetic ring-shaped disc 36. When the windings are deenergized, these coil springs 35 retain the armature in the centrally located condition shown in the drawing. In this central position of the armature, each ring-shaped disc 36 lies against a shoulder 37 of the bushing 20, with a predetermined amount of pressure.

The armature 22 sits loosely upon a switching rod 40 made of nonmagnetic steel. This rod 40 is slidably held in the iron cores 28 and 30. At each front side, the armature has a radial slot 41 in which diametrically oppositely lying rocker members 42 are pivotably mounted relative to the rod 40. The rocker members 42 are designed in the form of levers with two arms. One arm of these rocker members extends into one of a plurality of ring-shaped undercuts 43 of the switching rod 40. The undercuts 43 are arranged in two groups, of which one resides at the frontal side of the armature, and the other is situated at the other front side of the latter. The number of undercuts 43 of each group corresponds to the number of switching steps which are to be carried out by the motor in either direction Two diametrically oppositely lying notches 44 are provided in the plane of the slot 41, at the periphery of the armature 22. These notches 44 have the same width as the slot 41. A leaf spring 45 is introduced in each longitudinal notch 44. This leaf spring 45 is pivotally mounted on a pivot member 46 made of synthetic material as, for example, plastics. The free ends of the leaf springs 45 lie pressed against the rocker member 42, and tend to rotate them in the closed or blocking position.

Two diametrically oppositely lying ledge-shaped members 48 are inserted into the iron ring 21. The ledge-shaped member 48 extends into the longitudinal notches 44 of the armature, and thereby secure the latter against rotational movement. The ledge-shaped member 48 are provided at their both ends with inclined surfaces 49. As soon as the armature is displaced from its central position, one pair of the rocker members ride upon the panel-shaped members. The latter, then move the rockers out of their blocking position, against the force of the leaf-springs 45, so that the rockers are taken out of contact with the switching rod 40.

In each switching position, the switching rod 40 is held with a predetermined force through a detent arrangement in the ferromagnetic core 26. This detent arrangement has two balls 50 inserted into bores 51 of the ferromagnetic core, and spring 52 press these balls into one of the several undercuts 53 of the switching rod. The bores 51 are closed off through pin-shaped screws 54, against which these springs 52 abut.

A bracket 55 is secured to the ferromagnetic core 29, and carries an insulating plate 56 which a plurality of contact tracks 57 for the purpose of controlling the motor. The switching rod 40 projects over the plate 56, and has a transverse opening into which a stud member 58 is pressed into. Within the bore, is a spring 59 and the projecting portions 60 of a contact plate 61 which carries two contacts 62 operating in conjunction with the contact tracks 57. The spring 59 presses these contacts 62 against the contact tracks 57. The contact 62 and the contact tracks 57 monitor the current circuit through which the position of the switching rod is supported to the centrally located electronic control unit.

Two bolts or studs 64 made of nonmagnetic material, are pressed into the armature 22. These bolts pass through the ferromagnetic core or member 29 and above the plate 56. Through a yoke surrounding the switching rod 40 with substantial play, serves to connect the ends of these bolts. The yoke 65 carries two contact plates 66 which are provided with contact 67 for bearing with spring action against the contact tracks 57. In conjunction with the contact tracks 57, the contact 67 forms a circuit through which the position of the armature is reported or transmitted to the central control unit.

The bracket 55 is provided with a portion 70 which extends into a longitudinal notch 71 of the switching rod 40, and secures the rod, thereby, against rotation. An enclosing cap 72 extends protectively over the contacts and over the individual electrical terminals of the motor, not further shown in the drawing.

The switching rod 40 and the control rod 14 assume their extreme left position, in the drawing. To displace the switching rod 40 and the control rod 14 by one switching step to the right, the coil 17 is energized. The armature 22 becomes, thereby, attracted until it is spaced from the ferromagnetic core 28 and abuts the ring-shaped disc 36 made of nonmagnetic material. The bushing or bumper-shaped member 34 functions, thereby, so that the force applied to the armature at the beginning of the attracting motion, increases rapidly to an average value. The force then remains substantially constant and reaches afterwards the maximum value at the end of the motion during which the armature is attracted.

When the armature 22 is displaced towards the right, the two rockers 42 at the right hand, take the switching rod 40 along for one switching step. The two rockers 42 at the left contact the ledge-shaped portions 48 and become thereby rotated and moved out of contact with the switching rod 40. With the switching rod 40, the control rod 14 also moves towards the right, and controls the flow lines 15 in the desired manner.

The attracted position of the armature 22 is transmitted via signals through the contact arrangement 57, 67, and to the central control unit. The latter interrupts current flow to the coil 17, and as a result, the armature becomes returned to its central position through the action of the spring 35 on the right side of the drawing. The rockers 42 also on the right side of the drawing become, thereby, taken out of contact with the undercuts 43, and they are then pressed into the neighboring left undercuts 43 through the leaf springs 45. The two other rocker members 42 remain out of contact with the switching rod 40, until the armature has attained its central position. As a result of this feature, the armature is prevented from returning the switching rod 40 to its initial location of the switching motion, when the armature is on its return path.

The switching rod 40 can be displaced towards the right by four switching steps. After the fourth switching step, the two right rocker members 42 lie against the smooth surface of the switching rod, as shown in FIG. 2, for the two left rocker members 42. Any further energizing of the coils 17, has then no influence upon the switching rod 40, since the rocker members no longer extend into the gripping surfaces.

When the switching rod 40 is displaced towards the left, the processes described above become executed in a corresponding manner.

The armature can also be polarized through a permanent magnet, and the windings may be selectively energized to produce oppositely directed magnetic fields.

It will be understood that each of the elements described above, or two or more together, may also find a useful application in other types of constructions differing from the types described above.

While the invention has been illustrated and described as embodied in displacement motors, it is not intended to be limited to the details shown, since various modifications and structural changes may be made without departing in any way from the spirit of the present invention.

What is claimed as new and desired to be protected by Letters Patent is set forth in the appended claims.

We claim:

1. A displacement motor arrangement comprising, in combination, force applying means; a displacement member operatively coupled to said force applying means, said force applying means tending to displace said displacement member by a predetermined increment in one direction and in the opposite direction; electromagnetic means in said force applying means and having two spaced windings; armature means actuated by said electromagnetic means; spring means acting on said armature means for holding said armature means at a position midway between said windings when said armature is in the unactuated state, said armature means being loosely supported by said displacement member; and latching means operative in only one direction and linking said armature means and said displacement member so that upon actuation of said armature means said displacement member is displaced by a predetermined amount.

2. The displacement motor arrangement as defined in claim 1 wherein said latching means comprises at least one lever member pivoted at each end of said armature means; latching spring means directed against said lever member and tending to pivot said lever member into latching position; ramp means secured to said armature means and contacting said lever member for displacing said lever member out of said latching position when said armature means is displaced from said position midway between said windings.

3. The displacement motor arrangement as defined in claim 2 wherein said armature means has a radial slot at each end of said armature means for receiving two level members lying diametrically opposite in relation to said displacement member.

4. The displacement motor arrangement as defined in claim 3 wherein said armature means has two diametrically oppositely lying longitudinal notches at the circumference of said armature means, said notches communicating with slots at the ends of said armature means, said notches retaining said latching spring.

5. The displacement motor arrangement as defined in claim 4 wherein said latching spring means comprises a leaf spring common to the lever members of said two longitudinal notches, the ends of said leaf spring bearing against said lever members, said lever members being pivotally supported at said armature means.

6. The displacement motor arrangement as defined in claim 4 wherein said ramp means for deflecting said lever member comprises a ledge-shaped portion projecting radially from said armature means and extending into said longitudinal notches for preventing rotation of said armature means.

7. The displacement motor arrangement as defined in claim 3 wherein said armature means comprises a rod member having a plurality of undercuts, the number of undercuts corresponding to the number of displacement increments of said displacement member, said lever member extending into said undercuts.

8. The displacement motor arrangement as defined in claim 1 including two bushing members axially spaced and guiding said armature means, said bushing members being of nonmagnetic substance; and a ferromagnetic ring member between said bushing members, the internal diameter of said ferromagnetic ring member being substantially larger than the internal diameter of said bushing members.

9. The displacement motor arrangement as defined in claim 8 including ferromagnetic housing means substantially surrounding said windings; and a ferromagnetic disc member between said windings, said ferromagnetic disc member lying against the inner wall of said housing and the interior of said ferromagnetic ring.

10. The displacement motor arrangement as defined in claim 9 including ferromagnetic cores carried by said housing means and projecting into the interior of said windings.

11. The displacement motor arrangement as defined in claim 10 including ring-shaped portions at each end of said armature means for extending to said ferromagnetic cores carried by said housing means when said armature means is actuated.

12. The displacement motor arrangement as defined in claim 11 including bumper means between said ring-shaped portions and said ferromagnetic core on said housing means.

13. The displacement motor arrangement as defined in claim 1 including nonmagnetic, ring-shaped discs projecting from the periphery of said armature means and being abutted by said spring means.

14. The displacement motor arrangement as defined in claim 1 including a plate member with contact tracks parallel to said armature means; and contact means on said armature means for bearing against said contact tracks on said plate means.

15. The displacement motor arrangement as defined in claim 14 including stud means projecting from said armature means and carrying a contact for bearing against said contact tracks.

16. The displacement motor arrangement as defined in claim 1 wherein said windings are arranged axially one behind the other with respect to said armature means.

17. The displacement motor arrangement as defined in claim 1 wherein said displacement member comprises a switching rod member.